United States Patent [19]
Yoshimura

[11] Patent Number: 4,873,608
[45] Date of Patent: Oct. 10, 1989

[54] ELECTRIC SOLDERING IRON

[75] Inventor: Hiroshi Yoshimura, Osaka, Japan

[73] Assignee: Hakko Metal Industries Limited, Osaka, Japan

[21] Appl. No.: 152,891

[22] Filed: Feb. 5, 1988

[51] Int. Cl.[4] ............................................. H02H 5/22
[52] U.S. Cl. ...................................... 361/220; 361/212
[58] Field of Search ........................... 361/1, 212, 220; 174/5 R

[56] References Cited

U.S. PATENT DOCUMENTS

| | | | |
|---|---|---|---|
| 4,619,275 | 10/1986 | Ross et al. | 361/220 X |
| 4,654,748 | 3/1987 | Rees | 361/220 |
| 4,698,724 | 10/1987 | Barvee | 361/220 |
| 4,720,765 | 1/1988 | Weiss | 361/220 |

FOREIGN PATENT DOCUMENTS 61-22260 2/1986 Japan .

Primary Examiner—Derek S. Jennings
Attorney, Agent, or Firm—Mason, Fenwick & Lawrence

[57] ABSTRACT

An electric soldering iron having a structure capable of electrostatic disturbances of electronic components such as semiconductor elements and electric appliances due to static electricity charged on the user of the soldering iron or static electricity charged on the soldering iron itself. A conductor part is disposed at least on the surface portion of the grip of a soldering iron main body, and this conductor part can be grounded by means of an earth wire, and at the same time the surface of the power cord of the soldering iron is coated with a conductive coating material over the entire length and this conductive coating material can be also grounded, so that the static electricity charged on the user is discharged through the conductor part and earth wire, and also that the static electricity generated on the surface of the power cord during soldering work may be securely discharged.

7 Claims, 3 Drawing Sheets

ELECTRIC SOLDERING IRON

BACKGROUND OF THE INVENTION

1 Field of the Invention

This invention relates to an electric soldering iron, and more particularly to an electric soldering iron having a structure capable of preventing electrostatic disturbances of electronic components such as semiconductor elements and electronic appliances due to static electricity charged on the user of the soldering iron or static electricity charged on the soldering iron itself.

2. Description of the Prior Art

It is known well that, in soldering work of electronic components such as semiconductor elements or electronic appliances, the static electricity charged on the user causes electrostatic disturbances such as electrostatic breakdown of electronic components or reduction of reliability.

Conventionally, to prevent such electrostatic disturbances, the user wound a wrist trap with earth wire around his arm to ground it, or the tip of the electric soldering iron was grounded by means of an earth wire, as measures against static electricity.

These measures against static electricity, however, involved the following problems, and their improvements have been demanded.

That is, in the former measure, it is necessary to connect an earth wire to the body of the user, which may give rise to an extreme drop of the job efficiency for the operator who leaves is position often or for the operator working at various places.

In the latter measure, since the main aim of the earth wire is to remove the leak of the current in the heating system of the soldering iron, and it is not necessarily enough to remove the static electricity from the body of the operator.

In this respect, recently, electric soldering irons having a structure as shown in FIG. 3 have been invented (for example, the Japanese Utility Model Publications Nos. 61-22260 and 58-119964).

In this soldering iron, a conductor part b is provided on the surface of a grip a, and the conductor part b can be grounded from the earth wire c by way of the grounding clip d, so that the static electricity charge on the user is discharged in the sequence of the conductor part b, earth wire c, and grounding clip d. The symbol e denotes the tip of soldering iron, f is a heater, g is a power cord, and h is a three-pin plug.

Incidentally, the static electricity charge on the body of the operator is most likely to cause electrostatic disturbances, and recently as a result of development of electronic appliances, the very feeble static electricity generated in the power cord g cannot be ignored, and therefore even the structure of the soldering iron shown in FIG. 3 is not perfect as a means of prevention of static electricity, and a further improvement has been demanded.

BRIEF SUMMARY OF THE INVENTION

This invention is devised in the light of the above problems, and it is hence a primary object of this invention to present a novel electric soldering iron solving the above-discussed problems.

It is another object of this invention to present an electric soldering iron capable of completely discharging the static electricity on the human body and the feeble static electricity generated on the power cord, by grounding the entire surface of the soldering iron including the surface of the grip and the surface of the power cord.

It is still another object of this invention to present an electric soldering iron allowing the operator to move freely, without being confined by the earth wire when leaving his seat or moving around during work, without having to connect the earth wire to the body o the operator.

In the structure of the electric soldering iron of this invention, a tip heated by an electric heating means is provided at the front end side of the main body possessing a grip, and a power cord of said electric heating means is connected to the rear end side of said main body, and a conductor part is disposed at least on the surface portion of said grip, and this conductor part can be grounded by means of an earth wire, while the surface of said power cord is coated with a conductive coating material over the entire length, and said conductive coating material can be also grounded.

These and other objects of this invention, as well as the features thereof, will be understood and appreciated more clearly by referring to the detailed description and the claims given in conjunction with the drawings.

DETAILED DESCRIPTION OF THE PREFERRED EMBODIMENT

Figure 1:
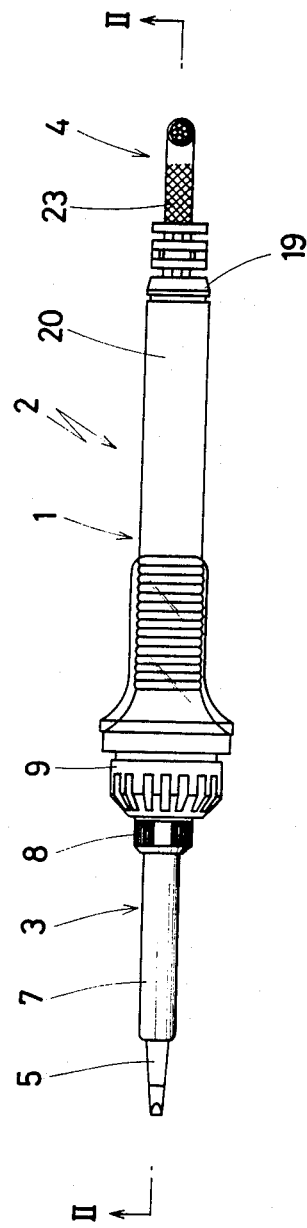
FIG. 1 is a side view showing an electric soldering iron in one of the embodiments of this invention.
Figure 2:
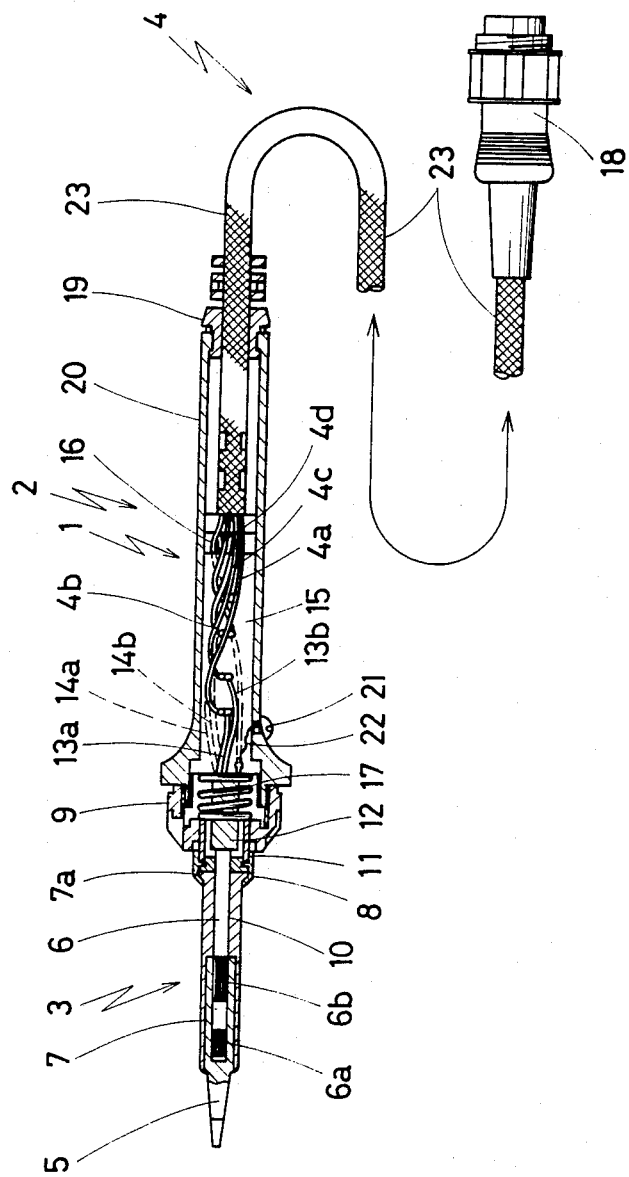
FIG. 2 is a sectional view of the same electric soldering iron along line II—II in FIG. 1.
Figure 3:
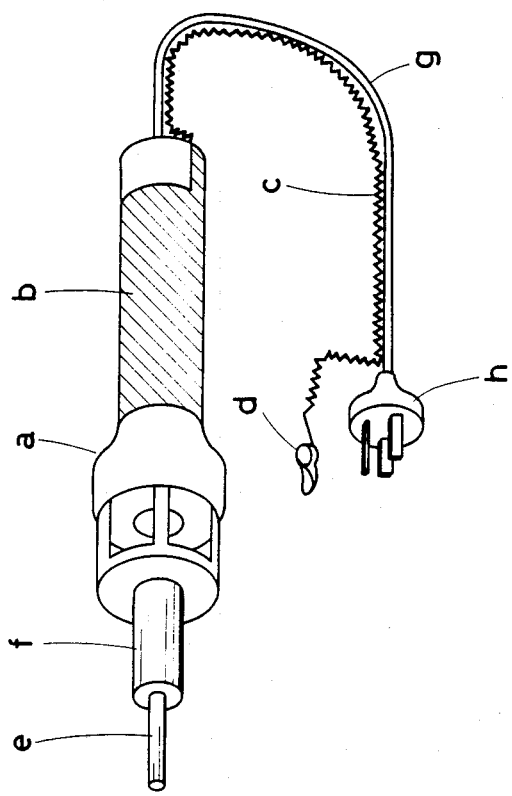
FIG. 3 is a perspective view showing a conventional electric soldering iron.

An electric soldering iron according to this invention is shown in FIG. 1 and FIG. 2. This electric soldering iron is used preferably in soldering work of electronic components such as semiconductor elements and electronic appliances, and a tip part 3 is disposed at the front end side of the main body 2 having a grip 1, and a power cord 4 is connected to its rear end side. This electric soldering iron possesses a structure to prevent electrostatic disturbances of said electronic components and electronic appliances due to static electricity in its entire constitution.

Said tip part 3 mainly comprises a tip 5 and a heater 6, and the half of the front end side of the heater 6 is inserted into the tip 5. The base end part of the tip 5 and the entire body of the heater 6 are covered with a metallic protective pipe 7 and are protected. A mounting flange 7a is disposed at the base end part of said protective pipe 7, and it is fitted to a nipple 9 of said main body 2 by means of a metallic cap nut 8. Numeral 10 is a fixing pipe for fixing the tip 5, and 11 is a fixing pipe holder.

Said heater 6 is to heat the tip 5, and has a sensor 6a to detect the temperature of the tip 5 and a heater unit 6b attached to its front end part. The base end part of the heater 6 is connected to a connector 12 of the main body 2. From this connector 12, heater wirings 13a, 13b, and sensor wirings 14a, 14b are drawn out, and they are respectively connected to wirings 4a, 4b, 4c, 4d of the power cord 4 at a terminal 15.

The power cord 4 is a five-core silicon cord, and contains, aside from above four wirings 4a to 4d, an earth wire 16 for grounding from the heating system of the tip 5.

That is, an earth spring 17 is disposed on the outer circumference of the connector 12, and this earth spring 17 is connected to the tip 5 by way of the protective pipe 7 at its front end side, while the rear end side is connected to said earth wire 16.

At the base end part of said power cord 4, a DIN plug 18 is fitted, and it can be inserted into a plug socket of the power supply side (not shown). Numeral 19 is a cord bush for holding and fixing the power cord 4 to the main body 2.

This main body 2 is a plastic tube, and its outer circumference is the grip 1, and said terminal 12 and other parts are built in its hollow inside.

A conductor part 20 is disposed on the surface portion of said grip 1, and this conductor part 20 can be grounded through the earth wire 16 of the power cord 4, DIN plug 18, and the power supply plug socket.

Said conductor part 20 is intended to ground the static electricity charged on the fingers of the operator holding the grip 1, and is disposed on the entire surface of the grip 1. As the conductor part 20, a conductive resin or conductive paint is applied on the entire surface of the grip 1, or a conductive material is inserted into the position of the grip 1 when forming the main body 2, or the main body 2 itself is made of a conductive material.

The conductor part 20 and the earth wire 16 are connected by way of a conductive screw 21 driven in the grip 1 and an auxiliary earth wire 22.

As shown in the illustrated example, meanwhile, when the earth wire 16 is commonly used as the earth wire from the heating system of the tip 5 and the earth wire of the conductor part 20, it is preferable to install a protective resistance of about 1 MΩ (not shown) in the midst of the wiring.

Besides, on the surface of said power cord 4, a conductive coating material 23 is formed to cover the entire length. This conductive coating material 23 is intended to discharge the static electricity charged on the surface of the power cord 4, and the base end of the conductive coating material 23 can be grounded by way of the DIN plug 18. This conductive coating material 23 is, practically, a conductive material knitted in a net form, but this is not limitative, and for example, a conductive coating film to cover the entire surface of the power cord 4 or other coating materials may be used.

In the soldering work of electronic appliances by using thus composed electric soldering iron, when the DIN plug is inserted into the power supply side plug socket, the entire electric soldering iron is grounded.

Therefore, when the operator holds the conductor part 20 of the grip 1 of the soldering iron in work, the static electricity charged on the body of the operator is discharged by way of the conductor part 20, earth wire 16, DIN plug 18, and power supply plug socket, so that the static electricity of the human body is prevented from being applied to the electronic components such as semiconductor elements and electronic appliances completely.

Besides, the static electricity generated on the surface of the power cord 4 during soldering work is discharged by way of the conductive coating material 23, DIN plug 18, and power supply plug socket.

Meanwhile, the location of disposition of the conductor part 20 of the grip 1 is not limited to the entire surface of the grip 1 as in the illustrated example, but may be variously changed as required, such as partial plural positions, as far as covering the contacting positions of the fingers of the hand operating the soldering iron, that is, at least surface portion of the grip 1.

Thus, as described in details so far, according to this invention, the conductor part is disposed on at leas the surface portion of the grip and this conductor part can be grounded by way of an earth wire, and the conductive coating material is formed to cover the entire length and this conductive coating material can be grounded, so that the following effects, among others, are brought about, and it is possible to present an electric soldering iron ideal for soldering work of electronic components such as semiconductor elements and electronic appliances.

(a) Since the entire soldering iron including the surface of the grip part and the surface of the power cord is grounded, not only the static electricity on the human body which is most likely to cause electrostatic disturbances, but also the feeble static electricity generated in the power cord can be completely discharged, and it is extremely advantageous for soldering work of electronic components and electronic appliances that are particularly susceptible to electrostatic disturbances even by feeble static electricity.

(b) Since it is not necessary to connect the earth wire to the human body, the operator can leave his position and move freely without being confined by the earth wire, and the job efficiency may be greatly enhanced for the operator who must often leave his position or work in various positions.

The practical embodiment described herein is intended only to disclose the technical features of this invention, and this invention must not be interpreted in a narrow sense, limiting only to the above embodiment, but should be understood in a wider sense as being modified variously within the true spirit and scope of the invention as specified in the claims.

What is claimed is:

1. In an electric soldering iron having a main body portion, a tip part to be heated by an electric heating means attached to a front end of the main body portion, the main body portion having a grip part, and a power cord for said electric heating means connected to the rear end of said main body portion, the main body portion including a conductive part disposed at least on the surface portion of said grip, and grounding wire means for this conductive part for electrically grounding the grip part:

the improvement comprising a conductive coating material formed on the surface of said power cord to cover the entire length thereof connected to electric ground for electrically grounding a sufficient portion of the power cord surface to prevent the power cord surface from becoming charged with static electricity.

2. An electric soldering iron according to claim 1, wherein said conductive coating material can be connected to a power supply side plug socket by way of a connection plug of said power cord.

3. An electric soldering iron according to claim 1, wherein said conductive coating material is a conductive wire knitted in a net form.

4. An electric soldering iron according to claim 1, wherein said conductive coating material is conductive material film to cover the entire surface of said power cord.

5. An electric soldering iron according to claim 1, wherein said conductive part is disposed on the entire surface of the grip part.

6. An electric soldering iron according to claim 1, wherein the grounding wire means of said conductive part is contained in said power cord, and can be connected to the power supply side plug socket through a connection plug of said power cord.

7. An electric soldering iron according to claim 1, wherein the grounding wire means of said conductive part is used commonly as the earth wire of said electric heating means.

* * * * *